No. 658,938. Patented Oct. 2, 1900.
J. B. DE ALZUGARAY.
PROCESS OF EXTRACTING GOLD, SILVER, &c., FROM ORES.
(Application filed May 1, 1899.)
(No Model.)
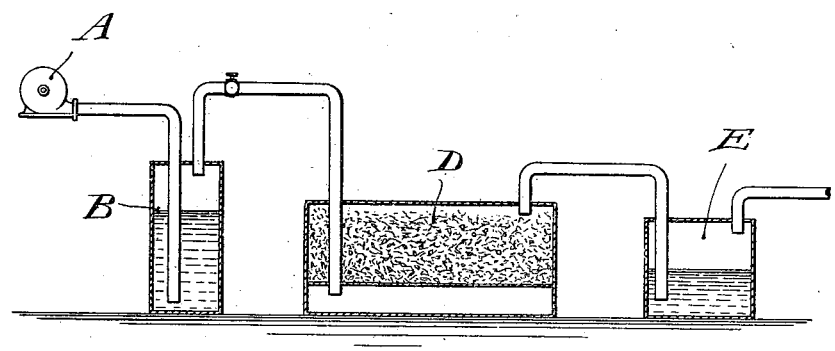
Witnesses:-
Edward Vieser.
George Barry Jr.
Inventor:-
Joseph Braceres de Alzugaray
by attorneys
Brown & Heward

UNITED STATES PATENT OFFICE.

JOSEPH BAXERES DE ALZUGARAY, OF LONDON, ENGLAND.

PROCESS OF EXTRACTING GOLD, SILVER, &c., FROM ORES.

SPECIFICATION forming part of Letters Patent No. 658,938, dated October 2, 1900.

Application filed May 1, 1899. Serial No. 715,110. (No specimens.)

*To all whom it may concern:*

Be it known that I, JOSEPH BAXERES DE ALZUGARAY, of Lola Villa, Shortlands, London, in the county of Kent, England, have invented certain new and useful Improvements in or Relating to the Extraction of Gold, Silver, and other Metals from Ores and the Like, of which the following is a specification.

In the accompanying drawing I have shown in diagrammatic form a convenient arrangement of apparatus for carrying out my invention. Thus A is a blower, B is a brominjar, D the extractor, having a false bottom, and E a condenser, all connected together by suitable pipes, which are provided with taps or cocks. The working of this apparatus will be clearly understood without further description.

The object of this invention is to effect the extraction of precious metals from their ores in a quicker, simpler, and more efficient manner than heretofore without the formation of slimes; and the invention consists in submitting moistened crushed ore to the action of strong cyanid solution in combination with a gaseous mixture of bromin and oxygen.

I may here state that I am aware that ores of precious metals have been treated with cyanogen and bromin, both separately and together, for the purpose of extracting the precious metals, and I desire, therefore, to state at the outset that I make no claim to the use of these substances *per se*.

In carrying out this invention the ore is crushed as usual, but not pulverized, (twenty mesh or coarse sand is suitable for general purposes,) and the crushed ore is moistened with the cyanid solution to such an extent that it will "ball" in the hand. In general the proportion of liquid employed may be about five per cent. of the weight of the ore to be treated. Hitherto it has been usual to use the cyanid in the form of a dilute solution, it being assumed that in that form it would act only on the precious metals, leaving other metals in the ores practically untouched; but I have discovered that this is altogether fallacious, and therefore I use the cyanogen in a concentrated state.

To produce the concentrated cyanid solution which I require, I dissolve one pound of cyanid in one hundred pounds of water, thus forming what I term a "concentrated solution," holding about one per cent. of cyanid, instead of a solution of one in a thousand or thereabout, as heretofore. Owing to the speed at which the action takes place I obtain the desired results without increasing the quantity of cyanid employed. I have discovered that, be the solution weak or strong, the same result takes place; but with the strong solution the effect on the ore is expedited to such an extent that, even assuming the proportion of other metals dissolved to be greater, the saving of time and labor is enormous. The moistened ore is then sifted into a suitable vessel (which I term the "extractor" and which is capable of being hermetically sealed) in such a way that it will be evenly and lightly distributed in the vessel, and a gaseous mixture of bromin and oxygen in varying proportions is caused to pass slowly upward through the mass. The oxygen for this purpose may be supplied from any convenient source. The gaseous mixture in its passage through the crushed ore will operate on the metals, precious and otherwise, to form soluble salts of the same. The excess of the gaseous mixture will pass away to a condenser. After sufficient treatment with the gaseous mixture (which will be determined by the nature of the ore under treatment and which may last from one and one-half hours to sixteen hours or more) the mass of ore will be washed with water, either cold or hot, which will dissolve out the soluble salts of the metals and hold them in a state of solution, and from this solution the precious metals will be recovered by precipitation with zinc or other suitable metal in the usual way or by electrolysis or otherwise.

By the process above described refractory ores can be successfully treated, and what is known as "coarse gold" may be dissolved, two results which have been impossible by the cyanid and chlorination processes heretofore employed.

I would here remark that by the term "cyanogen" or "cyanid" I intend to include any "cyanogen salt" or compound—for example, the cyanids, the ferrocyanids, and the ferricyanids of potassium and sodium—and that "bromin compounds" are included in the word "bromin." By the word "oxygen" I intend to include air, steam, carbonic acid, ozone, and the oxygenated compounds of chlorin or other oxygen-producing compounds.

An important feature of this invention may be here pointed out, viz: that as the ore is not pulverized but only crushed and as the amount of moisture employed is so slight comparatively slimes are not produced, an effect which will be at once appreciated by practical miners. The gaseous elements, compounds, or mixtures are generated outside the extractor, and they will be forced with a convenient amount of pressure through the mass of ore under treatment, and the elements will obviously be in a more or less concentrated form when used.

If it be desired to increase the chemical activity of the reaction, the gaseous elements may be heated to a convenient degree.

Having now particularly described and ascertained the nature of my said invention and in what manner the same is to be performed, I declare that what I claim is—

The process for extracting precious metals from their ores, consisting in moistening the crushed ore to such an extent that it will "ball" in the hand, with a concentrated solution of cyanid, placing the moistened ore in a gas-tight vessel, subjecting the same to the action of a gaseous mixture of bromin and oxygen, whereby the precious metals are converted into soluble salts of the same, obtaining the precious metals in solution by washing the ore, and finally recovering the metals from the solution in any suitable manner, all as herein described.

JOSEPH BAXERES DE ALZUGARAY.

Witnesses:
H. K. WHITE,
H. F. C. GOLTZ.